Aug. 5, 1941.  E. H. WELLECH ET AL  2,251,727
APPARATUS FOR THE MANUFACTURE OF FOLIATED GLASS
Original Filed May 25, 1937  4 Sheets-Sheet 2

Inventors
Edmund H. Wellech
Walter C. Weber
by Dudley Cole and Garner
Attorneys

Aug. 5, 1941.  E. H. WELLECH ET AL  2,251,727
APPARATUS FOR THE MANUFACTURE OF FOLIATED GLASS
Original Filed May 25, 1937   4 Sheets-Sheet 4
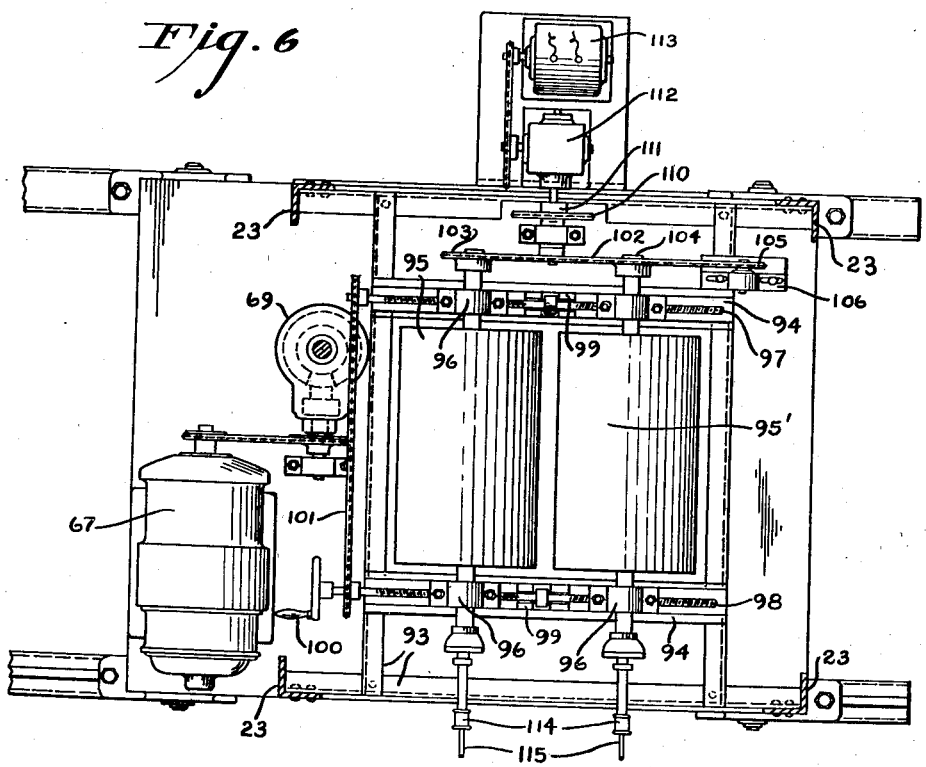

Patented Aug. 5, 1941

2,251,727

UNITED STATES PATENT OFFICE 2,251,727

APPARATUS FOR THE MANUFACTURE OF FOLIATED GLASS

Edmund H. Wellech, Corning, and Walter C. Weber, Painted Post, N. Y., assignors to Corning Glass Works, Corning, N. Y., a corporation of New York Original application May 25, 1937, Serial No. 144,712. Divided and this application February 18, 1938, Serial No. 191,294

5 Claims. (Cl. 49—1)

The present invention is a division of the copending Wellech-Weber application, Serial Number 144,712, filed May 25, 1937, and relates to apparatus for the manufacture of foliated glass.

There are a great many possible uses for glass in this form, quite a number of which are suggested in British Patent No. 449,239 granted to P. E. Harth, June 11, 1936. The extent of the commercial possibilities of such glass, however, depends directly upon the facilities available for its quantity production in the thicknesses selected as most suitable for the particular applications of use. Foliated glass may be produced by blowing glass into bubbles until they break or fracture, as suggested by Harth. Since, however, the wall of a bubble of glass is tapered from the root, much of the foliated glass produced in this manner will be wedge shaped. Furthermore, there is no way of insuring that a major portion of the flakes so produced will be of a uniform thickness, or of a thickness having the greatest range of commercial utility. It is therefore necessary, in order to obtain a quantity of flakes within certain defined limitations as to thickness, to produce an excessive amount of material and to then sort the desired material therefrom.

An object of the present invention is the quantity production of foliated glass of any of a wide range of uniform thicknesses suitable for commercial application.

Features of the invention include (a) a container in the form of a rotating bowl having a bottom outlet from which molten glass flows in the form of a cylindrical stream; (b) provisions for applying heat to the molten glass in the bowl and also to the glass as it is issuing from the outlet thereof to so control the viscosity of the glass that the wall thickness of the stream can be maintained in accordance with that of the foliated glass desired; (c) a pipe for supplying air for attenuating and setting the glass when heavy gauges of foliated glass are being produced, and also for breaking it up into foliated form when the lighter gauges of foliated glass are being produced; (d) a rotating arm in the path of the stream which breaks up the glass at a selected level below the bowl outlet when the heavier gauges of foliated glass are being produced, and (e) a fan which separates the foliated glass from any cullet which may at times be produced, and further separates and directs the movement of the different gauges of foliated glass into separate chambers.

Other features include a pair of power driven rollers between which the streams of glass of certain wall thicknesses are preferably passed before being broken up into foliated form.

In the drawings,

Figs. 1 and 2, arranged with Fig. 1 above Fig. 2, comprises a side elevation partly in section of an apparatus embodying this invention;

Fig. 3 comprises a side elevation partly in section of a fragmentary portion of a modified form of the apparatus illustrated in Fig. 2;

Fig. 4 comprises a side elevation partly in section of a fragmentary portion of a modified form of the apparatus illustrated in Fig. 1;

Fig. 6 is a plan view taken on line 6—6 of Fig. 4.

Figure 1:
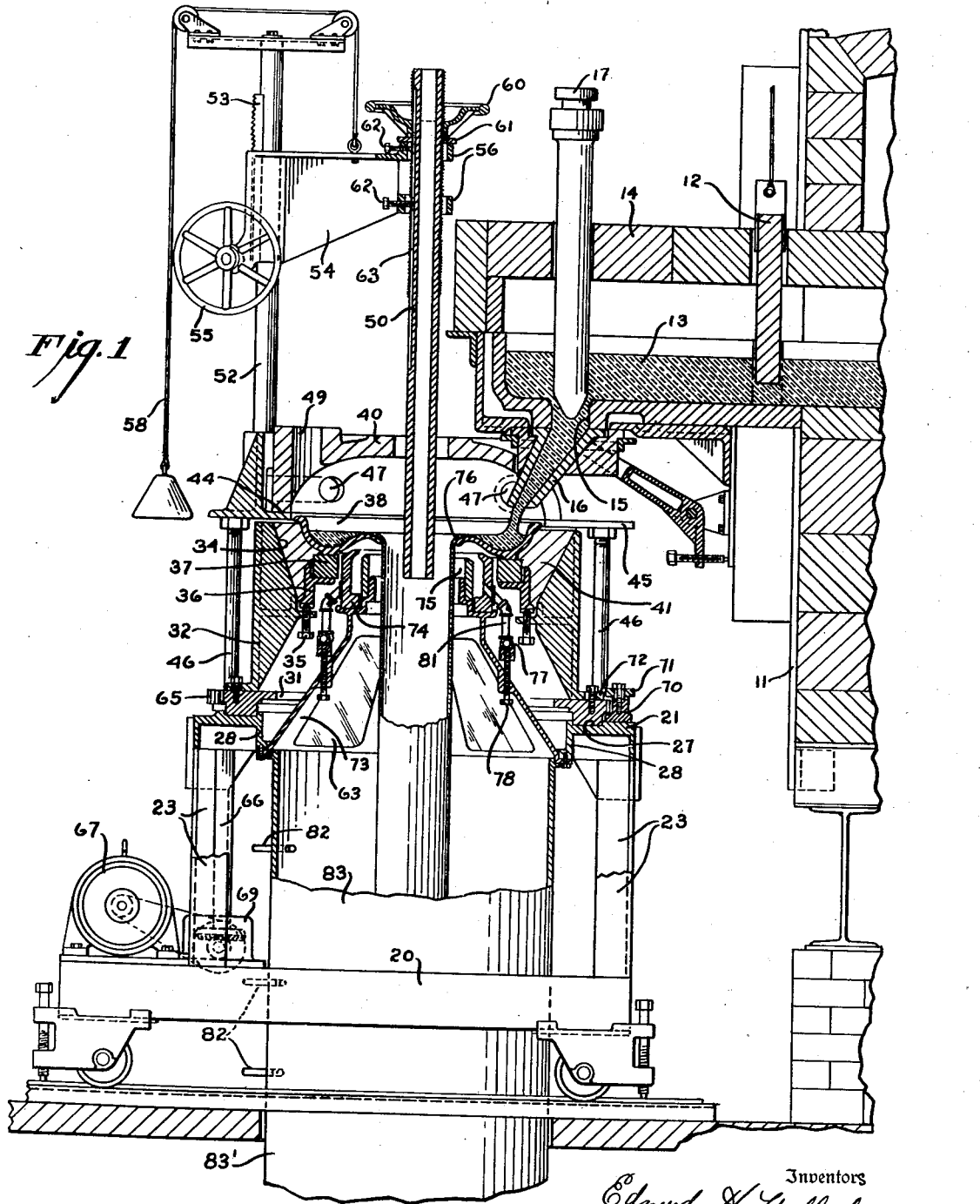
Figure 2:
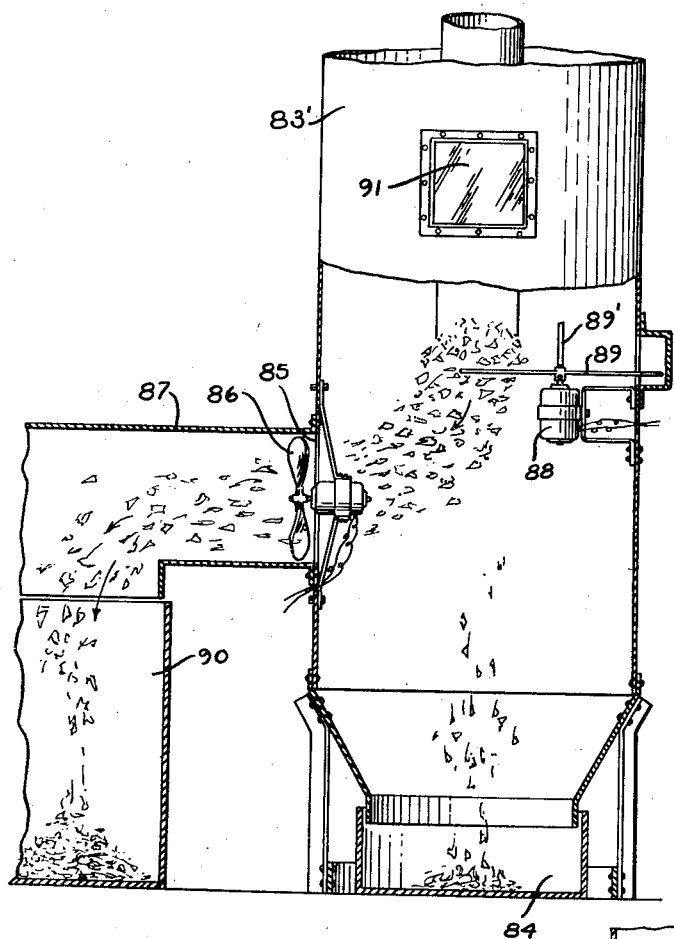

In the apparatus shown in Fig. 1, a melting tank 11 is provided with a gate 12 for cutting off the flow of glass 13 to the extended forehearth 14. The rate of flow from the forehearth, through a bottom outlet 15 and a connected spout 16, is controlled by a flow control needle 17 which may be elevated or lowered by overhead apparatus (not shown) to regulate the flow in any well known manner.

The apparatus for intercepting the stream of glass flowing from the spout 16 and for converting such glass into foliated form is mounted on a suitable carriage 20. A square frame-like casting 21 is fixed to four angle-iron standards 23 secured to the carriage and has a shallow annular channel 27 in its upper surface surrounding the upper end of a flanged cylindrical portion 28. The channel 27 serves as a track for a ring gear 31 which supports a cylinder 32. This cylinder has a plurality of internal webs 34 each having a protruding lug tapped to accommodate a cap screw 35. These screws serve as adjustable leveling supports for an annular casting 36 which serves as a bed for a refractory ring 37 on which a bowl 38 of refractory material is mounted below the spout 16. The external wall of the bowl 38 is insulated against excessive heat loss by insulating refractory material 41 packed between it and cylinder 32 and is covered by a refractory dome 40 supported by an annular flange 44 of an externally square casting 45 in turn supported by four studs 46 extending between it and the casting 21. The dome 40 has a number of apertures 47 for receiving burners (not shown) and an aperture 49 serving as a flue for waste gases. Other openings are obviously provided for accommodating the spout 16 and an air supply pipe 50.

Extending upwardly from the casting 45 is a post 52 having a rack 53 thereon. An air pipe supporting bracket 54 is arranged for up and down movement on this post through the medium of a pinion, not shown, in mesh with the rack 53, adapted to be rotated by a hand wheel 55. The weight of bracket 54 and of equipment supported by it (described hereafter) is counterbalanced by a weighted cable 58 so that the bracket 54 remains at any level to which it has been moved. The free end of bracket 54 is provided with two horizontally disposed rings 56 through which the air supply pipe 50 passes. The upper portion of this pipe is threaded to receive a hand wheel 60 supported by a thrust washer 61 resting on the top of the upper ring 56 and by means of which a closer adjustment of the height of pipe 50 can be obtained than is practicable with hand wheel 55. Cap screws 62 threaded through the walls of the rings 56 enter a vertical groove 63 in pipe 50 to prevent the pipe being turned during rotation of hand wheel 60. Air is delivered to pipe 50 in any conventional manner as by a flexible tubing connected to the top end of the pipe.

In mesh with the teeth of the ring gear 31 is a pinion 65 attached to a shaft 66 passing through a suitable bearing in casting 21 and driven by any suitable power source, herein shown as an electric motor 67 and an intervening gear reduction unit 69. Arranged around the ring gear 31 are a number of brackets 70 carrying rollers 71 adjustably secured to the casting 21. These rollers are brought into contact with the flange 72 of cylinder 32 to prevent friction which would otherwise occur between the gear 31 and the side walls of the channel 27.

Secured to the flange of the cylindrical portion 28 of casting 21 is a hollow frusto-conically shaped casting 73 adapted to support concentrically arranged refractory rings 74 and 75 which together form an annular burner port having its opening directed toward the lower external edge of the bowl outlet 76. A fuel line 77 encircles the casting 73 and is adjustably supported on blocks carried by cap screws 78 threaded through lugs integral with casting 73. The fuel line has a number of branches 81 terminating in suitable burner openings through the refractory ring 74.

A sheet metal jacket comprising sections 83 and 83' extends from the bottom edge of casting 73 through the carriage 20 to a floor below the level of the carriage where it is fitted with a removable cullet pan 84. A series of tubes 82, which may be connected with a source of air supply, enter the section 83 and serve a purpose which will be brought out hereinafter. One side of the jacket section 83' is provided with a side opening 85 equipped with an exhaust fan 86 for drawing foliated glass through a flue 87 into a suitable container 90. Opposite and slightly above the flue opening a motor 88 drives an arm 89, which may be set at any selected height on the motor shaft 89'. This arm passes through the path of the glass cylinder when certain gauges of foliated glass are being produced and is set at a height dependent on the gauge of glass desired, as will hereinafter be fully described. Windows 63 in the casting 73 and a window 91 in the jacket section 83' enable an attendant to observe the character of product being produced.

In operation, the bowl 38 is rotated at a constant speed, and needle 17 raised to allow a stream of molten glass to flow into the bowl. The glass accumulating in bowl 38 rises and finally starts flowing over the curb of its bottom outlet 76. At the beginning this glass will be in the form of strings and cords which will drop to the bottom of the jacket in the form of cullet. As the glass rises higher, it finally emerges from the outlet in the form of a cylindrical stream, which is held in suitably attenuated form by the introduction of air in the hollow thereof through pipe 50. The wall thickness of this stream depends very much upon the adjustment of needle 17 and the condition of the glass, which is very definitely maintained at a viscosity depending on the gauge of foliated glass to be produced by regulation of the amount of heat applied to the glass in bowl 38 and to the stream as it issues from the bowl outlet.

When light gauges of foliated glass are to be produced, i. e., gauges from 1 to 5 microns in thickness, the various burners used in applying heat to the glass, in bowl 38 and to the stream as it issues from the bowl outlet, are so adjusted as to maintain the viscosity of the glass very low. It has been found that the wall thickness of the cylindrical stream issuing from the outlet may be made so thin that air issuing from the pipe 50 will immediately set the glass and blow it into foliated form. By raising the viscosity of the glass and rate of flow, the wall thickness of the stream can be progressively increased so that the set glass portion of the cylinder will remain intact until it has reached a level below the bottom end of pipe 50 depending on the viscosity of the glass issuing from the bowl outlet, and will then break up into foliated form.

When using certain glass formulae the distance below the outlet at which the glass breaks up may, however, be held more constant and, therefore, a more uniform product obtained by also introducing air directly into the jacket section 83 through an appropriate one of the tubes 82. Air supplied through the selected one of the tubes 82 coacts with that supplied by pipe 50 to create a turbulent air movement within the jacket such as to positively insure breaking up of the set glass exactly at the distance below the bowl outlet at which the desired gauge of foliated glass can best be produced.

In the production of the heavier of the above gauges of foliated glass, the set glass of the cylinder formed attains mechanical strength necessitating its being broken up by mechanical means. The weight of this set pendant glass is under these circumstances utilized as a drawing means, and by breaking away the lower end of the cylinder at a selected distance below the bowl outlet a definite and uniform pull on the glass at the root may be maintained. It has been found that by proper regulation of the viscosity of the glass flowing from the bowl outlet and the spacing of breaker arm 89 a suitable distance below the outlet any of the heavier of the above specified range of gauges of foliated glass can be produced. More specifically, to produce foliated glass of such gauge that the cylinders drawn are of the thinnest form needing to be broken up mechanically, the breaker arm 89 should be so spaced from the outlet 76 as to break away the bottom end of the cylinder just before its weight is such that separation in mass at the outlet would otherwise occur, whereas to produce foliated glass of still heavier of the above range of gauges, the breaker arm 89 should be moved nearer the outlet to decrease the rate of draw.

Still heavier gauges of foliated glass, for example, gauges ranging from 5 to 10 microns in thickness, can be produced by the foregoing method by appropriately increasing the viscosity of the glass and volume of flow and by raising the breaker arm so as to maintain the amount of pendant glass at a minimum. When, however, the wall thickness of the stream is increased to the extent necessary to produce the heavier gauge of cylinder, it becomes necessary to substantially increase the volume of air supplied by pipe 50 in order to prevent the cylinder from collapsing, and unless the air is of constant volume there will result a variation in rate of diameter and wall thickness of the cylinder produced. In the quantity production of these heavier gauges of foliated glass, it is preferable, therefore, to flatten the cylinder while it is still in a plastic condition so as to very greatly reduce the area for the escape of air supplied to it by pipe 50. This enables a comparatively small volume of air to suffice to hold the cylinder in attenuated form; and this small volume of air can be readily regulated to maintain a constant pressure against the cylinder wall so that better uniformity in wall thickness is possible than when the method employed requires a large volume of air.

Figure 4:
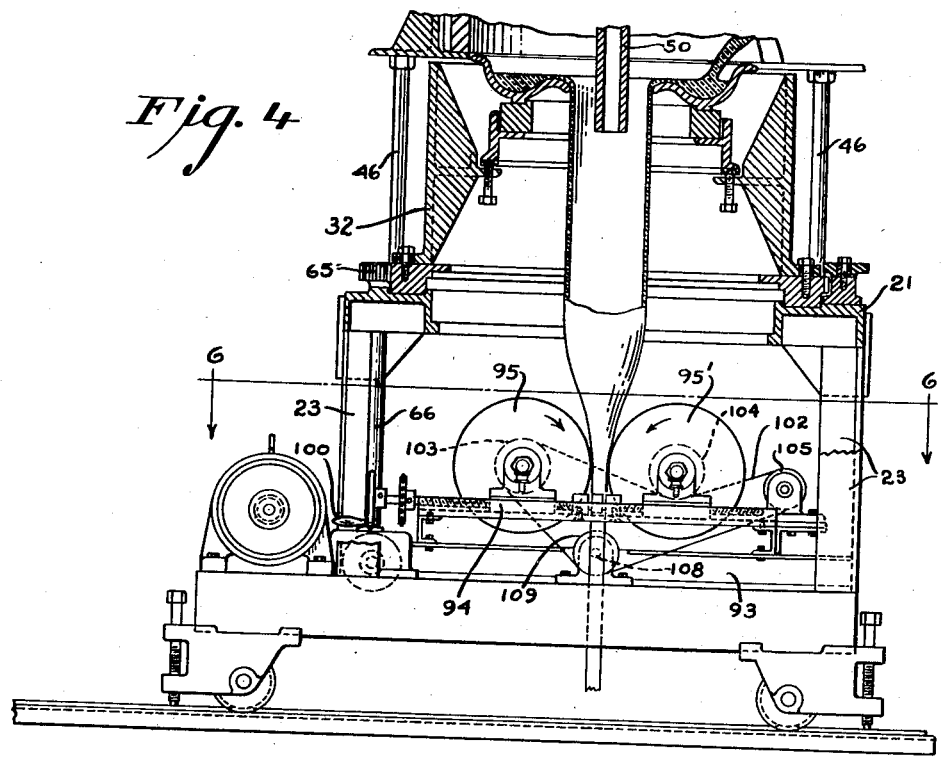
Figure 5:
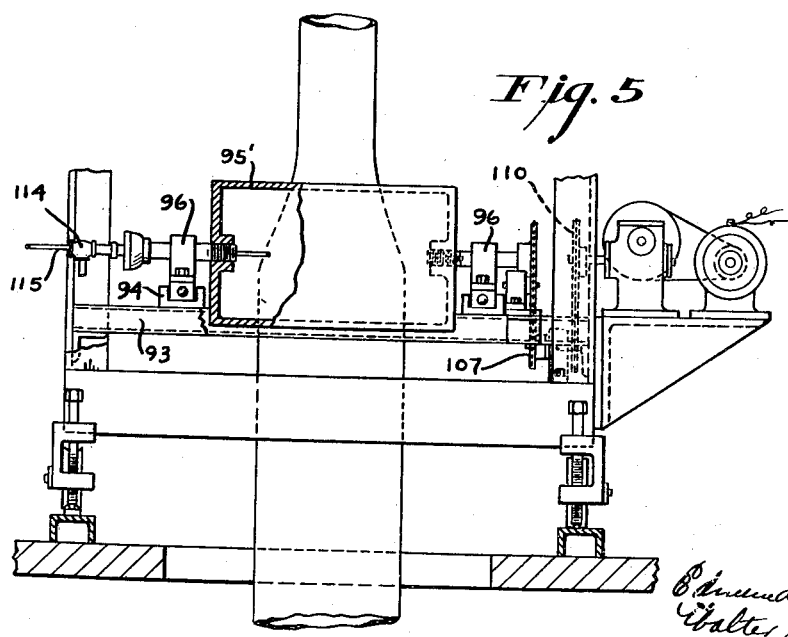
Fig. 5 is a side elevation of the lower portion of Fig. 4.

A specific form of apparatus suitable for carrying out the last described method of producing the heavier gauges of foliated glass is illustrated in Figs. 4, 5, and 6. This apparatus includes a frame-work 93, secured to the four upright angle irons 23, and having mounted thereon a pair of bearing supporting channel rails 94. Arranged between rails 94 are two rollers 95 and 95' each having pipes threaded in its ends serving as shafts on which they may be rotated. These shafts are journaled in suitable bearings 96 arranged on rails 94 and slidable thereon toward or away from each other by means of adjusting screws 97 and 98 threaded through the bases of the respective bearings, the screws themselves being keyed against endwise movement at 99 (Fig. 6). A hand crank 100 is secured to one end of screw 98 which is in turn geared to screw 97 by a drive chain 101 and suitable sprockets mounted on the screws. By this means the space between the rollers can be easily regulated.

The rollers 95 and 95' are driven in clockwise and counter-clockwise directions, respectively, by a drive chain 102 engaging sprocket wheels 103 and 104 on the roller shafts, an idler sprocket 105 journaled in a slidable bearing 106, and a sprocket 107 secured to one end of a countershaft 108 (Fig. 4). The other end of the countershaft carries a sprocket 109 driven by a chain 110 (Figs. 5 and 6) extending from a sprocket 111 of a reduction gear assembly 112 which is in turn driven by a motor 113.

The rollers 95 and 95' are water cooled, and to accomplish this one end of a shaft of each roller is coupled to a pipe terminating in a T fitting 114 (Figs. 5 and 6), the side entrance of which is to be connected to a water supply hose (not shown). A tube 115 passes through the run of the T into the roller and provides a passageway for the flow of water out of the roller.

In employing the foregoing apparatus the drums 95 and 95' may be initially separated to the extent necessary to readily permit the down flowing plastic glass cylinder to pass between them, and may then be moved toward one another as necessary to flatten the cylinder to the extent found most suitable. The surface speed of the rollers may be such as to aid in the gravitational draw of the cylinder, but satisfactory results have been obtained by so adjusting their speed that they tend to slightly retard the gravitational movement. Since the rollers have a cooling medium constantly circulating through them, the flattened cylinder issuing therefrom will be fully set and upon encountering the path of the breaker arm 89 will be broken up into foliated form.

Figure 3:
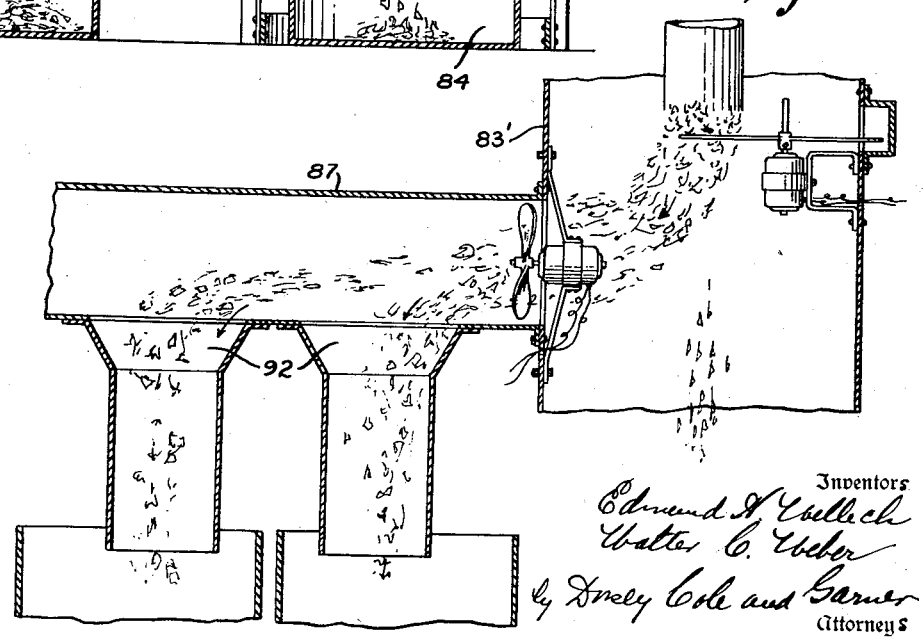

Irrespective of the gauge of foliated glass being produced, such glass, instead of being permitted to drop to the bottom of the jacket and become mixed with cullet, is drawn through opening 85, flue 87, and into a suitable chamber 90 by the suction created by fan 86. The flue 87 has also been illustrated in Fig. 3 as equipped with a series of passageways 92 through which the foliated glass particles pass in accordance with their weight. Any desired number of such passageways may, obviously, be provided.

As will be well understood, the rotation of the bowl 38 is not essential, but insures uniformity of wall thickness of the stream issuing from the bowl outlet, thereby contributing to uniformity in thickness of the foliated glass produced.

While the apparatus illustrated in Fig. 1 shows an annular burner for supplying heat to the lip of the bowl outlet and to the glass issuing therefrom, the use of such burner may be dispensed with, as illustrated in Fig. 4 of the disclosure. In such a case ample heat is applied to the glass issuing from the bowl outlet by a change in the height of the air supply pipe 50. When this pipe is properly set the air flowing through it creates a down draft which draws hot gases from the area above the bowl, and which ordinarily pass out of flue 49, over the glass issuing from the bowl outlet, making the employment of the annular burner unnecessary.

What we claim is:

1. In a glass working apparatus for the production of foliated glass, a bowl having a bottom outlet surrounded by an annular curb over which low viscosity glass flows in the form of a cylinder, an enclosure for the cylinder, and means including a device for directing a stream of fluid into said enclosure in a direction transverse to the direction of flow of the cylinder for breaking away the lower end of the cylinder from the parent body.

2. In a glass working apparatus for the production of foliated glass, a bowl having a bottom outlet surrounded by an annular curb over which low viscosity glass flows in the form of a cylinder, means for supplying cooling air to the cylinder as required to maintain the diameter of the cylinder substantially the same as when flowed over said curb and to set the glass and break it away from the parent body, an enclosure for the cylinder and a device for directing a stream of fluid into said enclosure to assist in the breaking of the cylinder.

3. In a glass working apparatus for the production of foliated glass, a bowl having a bottom outlet surrounded by an annular curb over which low viscosity gas flows in the form of a cylinder, means for supplying cooling air to the cylinder as required to set up the glass and to maintain the diameter of the cylinder substantially the same as when flowed over said curb, and fluid supply means arranged at a substantial distance below said curb and positioned to direct a stream of fluid toward the path of the flow of the cylinder.

4. In a glass working apparatus, a container from which a thin annular stream of low viscosity glass is caused to flow, means for bringing cooling air into contact with said stream to set the glass and break it up into foliated form, an enclosure for the stream, a chamber for the receipt of the foliated glass in communicative relation with said enclosure, and means for drawing the foliated glass into said chamber as it is being produced.

5. In a glass working apparatus for the production of foliated glass, a bowl having a bottom outlet surrounded by an annular curb over which low viscosity glass flows in the form of a hollow cylinder, means for supplying air to the interior of the cylinder in sufficient volume to set and break up the glass issuing from said outlet, a receptacle for foliated glass, an enclosure for the cylinder in communication with said receptacle, and a fan arranged to establish a current of air between said enclosure and receptacle.

EDMUND H. WELLECH.
WALTER C. WEBER.